United States Patent
Yamakami et al.

(10) Patent No.: US 12,068,628 B2
(45) Date of Patent: Aug. 20, 2024

(54) POWER RECEIVING DEVICE, WITH COMPUTER, SETTING INCOMING POWER BASED ON SPECIFIC VALUE AND POWER SUPPLYING CAPACITY OF POWER SUPPLYING DEVICE

(71) Applicant: BROTHER KOGYO KABUSHIKI KAISHA, Nagoya (JP)

(72) Inventors: Shuhei Yamakami, Nagoya (JP); Munetoshi Soma, Nagoya (JP); Hiromasa Takahashi, Gamagori (JP); Masakazu Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/059,483

(22) Filed: Nov. 29, 2022

(65) Prior Publication Data
US 2023/0170718 A1    Jun. 1, 2023

(30) Foreign Application Priority Data

Nov. 30, 2021    (JP) .................................. 2021-193892

(51) Int. Cl.
*G03G 15/00*    (2006.01)
*H02J 7/00*    (2006.01)

(52) U.S. Cl.
CPC .......... *H02J 7/00712* (2020.01); *G03G 15/80* (2013.01)

(58) Field of Classification Search
USPC ........................................... 399/88
See application file for complete search history.

(56) References Cited

U.S. PATENT DOCUMENTS

2011/0228302 A1* 9/2011 Golding ............... H04N 1/0035
                                                                  206/320
2017/0222434 A1* 8/2017 Yoshikoshi ........ G03G 15/5004

FOREIGN PATENT DOCUMENTS

JP        2018-148621 A      9/2018

* cited by examiner

*Primary Examiner* — Quana Grainger
(74) *Attorney, Agent, or Firm* — KENEALY VAIDYA LLP

(57) ABSTRACT

A power receiving device includes a storage and a computer. The computer stores a first operating condition indicating a past operating condition of the power receiving device in the storage. The computer detects a power supplying capacity within which a power supplying device can supply power and identifies a specific value in relation to the first operating condition from the storage. The computer sets an incoming power based on both the detected power supplying capacity and the identified specific value, thereby allowing the power supplying device to send the set incoming power.

15 Claims, 15 Drawing Sheets

FIG. 2

| USB STANDARD OPERATING MODE | RECOMMENDED VOLTAGE [V] | SUPPLY CURRENT [A] |
|---|---|---|
| USB2.0 | 5 | ~0.5 |
| USB3.1 | 5 | ~0.9 |
| USB BC1.2 | 5 | ~1.5 |
| USB Type-C(1.5A) | 5 | ~1.5 |
| USB Type-C(3A) | 5 | ~3.0 |
| USB PD | 5~20 | ~5.0(20V)<br>~3.0(OTHER THAN 20V) |

FIG. 5

| RANGE OF CONNECTION TIME PERIOD | COUNT VALUE |
|---|---|
| 4h~ | 29 |
| 3~4h | 59 |
| 2~3h | 36 |
| 0~2h | 14 |

| USB STANDARD OPERATING MODE | VOLTAGE [V] | CURRENT [A] | | | |
|---|---|---|---|---|---|
| | | RANGES OF CONNECTION TIME PERIOD OF USB CABLE | | | |
| | | 4h~ | 3~4h | 2~3h | 0~2h |
| USB2.0 | 5 | 0.5 | 0.5 | 0.5 | 0.5 |
| USB3.1 | 5 | 0.5 | 0.5 | 0.5 | 0.5 |
| USB BC1.2 | 5 | 0.5 | 1.0 | 1.0 | 1.0 |
| USB Type-C(1.5A) | 5 | 0.5 | 1.0 | 1.5 | 1.5 |
| USB Type-C(3A) | 5 | 0.5 | 1.0 | 1.5 | 3.0 |
| USB PD | 15 | 0.5 | 1.0 | 1.5 | 3.0 |

FIG. 8

| RANGE OF NUMBER OF SHEETS | COUNT VALUE |
|---|---|
| 0-5 SHEETS | 8 |
| 6-10 SHEETS | 17 |
| 11-15 SHEETS | 47 |
| 16 SHEETS OR GREATER | 35 |

FIG. 9

| USB STANDARD OPERATING MODE | VOLTAGE [V] | CURRENT [A] ||||
|---|---|---|---|---|---|
| | | RANGES OF NUMBERS OF SHEETS EACH PRINTED BY POWER OF SINGLE CHARGE ||||
| | | 0-5 SHEETS | 6-10 SHEETS | 11-15 SHEETS | 16 SHEETS OR GREATER |
| USB2.0 | 5 | 0.5 | 0.5 | 0.5 | 0.5 |
| USB3.1 | 5 | 0.5 | 0.5 | 0.5 | 0.5 |
| USB BC1.2 | 5 | 0.5 | 1.0 | 1.0 | 1.0 |
| USB Type-C (1.5A) | 5 | 0.5 | 1.0 | 1.5 | 1.5 |
| USB Type-C (3A) | 5 | 0.5 | 1.0 | 1.5 | 3.0 |
| USB PD | 15 | 0.5 | 1.0 | 1.5 | 3.0 |

FIG. 12

| TIME PERIOD | COUNT VALUE | PRINTING FREQUENCY |
|---|---|---|
| 00:00–03:00 | 1 | 0.9% |
| 03:00–06:00 | 2 | 1.8% |
| 06:00–09:00 | 5 | 4.6% |
| 09:00–12:00 | 36 | 32.7% |
| 12:00–15:00 | 19 | 17.3% |
| 15:00–18:00 | 26 | 23.6% |
| 18:00–21:00 | 14 | 12.7% |
| 21:00–24:00 | 7 | 6.4% |
| TOTAL | 110 | – |

| USB STANDARD OPERATING MODE | VOLTAGE [V] | CURRENT [A] | | | |
|---|---|---|---|---|---|
| | | PRINTING FREQUENCIES IN TIME PERIODS OF STARTING CHARGING [%] | | | |
| | | 0~5 | 5~15 | 15~30 | 30~ |
| USB2.0 | 5 | 0.5 | 0.5 | 0.5 | 0.5 |
| USB3.1 | 5 | 0.5 | 0.5 | 0.5 | 0.5 |
| USB BC1.2 | 5 | 0.5 | 1.0 | 1.0 | 1.0 |
| USB Type-C(1.5A) | 5 | 0.5 | 1.0 | 1.5 | 1.5 |
| USB Type-C(3A) | 5 | 0.5 | 1.0 | 1.5 | 3.0 |
| USB PD | 15 | 0.5 | 1.0 | 1.5 | 3.0 |

POWER RECEIVING DEVICE, WITH COMPUTER, SETTING INCOMING POWER BASED ON SPECIFIC VALUE AND POWER SUPPLYING CAPACITY OF POWER SUPPLYING DEVICE

REFERENCE TO RELATED APPLICATIONS

This application claims priority from Japanese Patent Application No. 2021-193892 filed on Nov. 30, 2021. The entire content of the priority application is incorporated herein by reference.

BACKGROUND ART

A conventional power supply system configured of a power supplying device and a power receiving device. The power supplying device and power receiving device conform with the Universal Serial Bus Power Delivery (USB-PD) standard, and the power supplying device can supply power to the power receiving device in a manner depending on the results of communication between the two devices. The level of power received by the power receiving device is set based on loss in a connection cable, which is included in the power receiving path in the power supply system.

DESCRIPTION

Operating conditions of the power receiving device vary among different users that operate the device. For example, certain users may operate the power receiving device infrequently. In such cases, the power receiving device will receive enough power, even if the level of incoming power is reduced. However, since the conventional power supply system does not regulate the supply of power in accordance with operating conditions of the power receiving device, the power supplying device may supply excessive power to the power receiving device under various operating conditions of the power receiving device. This may lead to various problems such as degradation of the power receiving device and excessive heat generation in the power receiving device.

In view of the foregoing, it is an object of the present disclosure to provide a power receiving device capable of receiving appropriate power in accordance with operating conditions of the power receiving device.

In order to attain the above and other object, the present disclosure provides a power receiving device. The power receiving device includes a storage and a computer. The computer is configured to perform: storing a first operating condition indicating a past operating condition of the power receiving device in the storage; detecting a power supplying capacity within which a power supplying device can supply power; identifying a specific value in relation to the first operating condition from the storage; and setting an incoming power based on both the detected power supplying capacity and the identified specific value, thereby allowing the power supplying device to send the set incoming power.

With the above structure, the power receiving device stores the first operating condition, which is a past operating condition. The power receiving device sets the incoming power based on the power supplying capacity of the power supplying device and a specific value for the first operating condition of the power receiving device. In this way, the power receiving device can receive appropriate power in accordance with the operating condition.

FIG. 2 is a table illustrating USB standard operating modes.

FIG. 5 is a schematic diagram illustrating a connection time counter.

FIG. 6 is a schematic diagram illustrating a first incoming power determination table.

FIG. 8 is a schematic diagram illustrating a sheet number counter.

FIG. 9 is a schematic diagram illustrating a second incoming power determination table.

FIG. 12 is a schematic diagram illustrating a time period counter.

FIG. 13 is a schematic diagram illustrating a third incoming power determination table.

Figure 1:
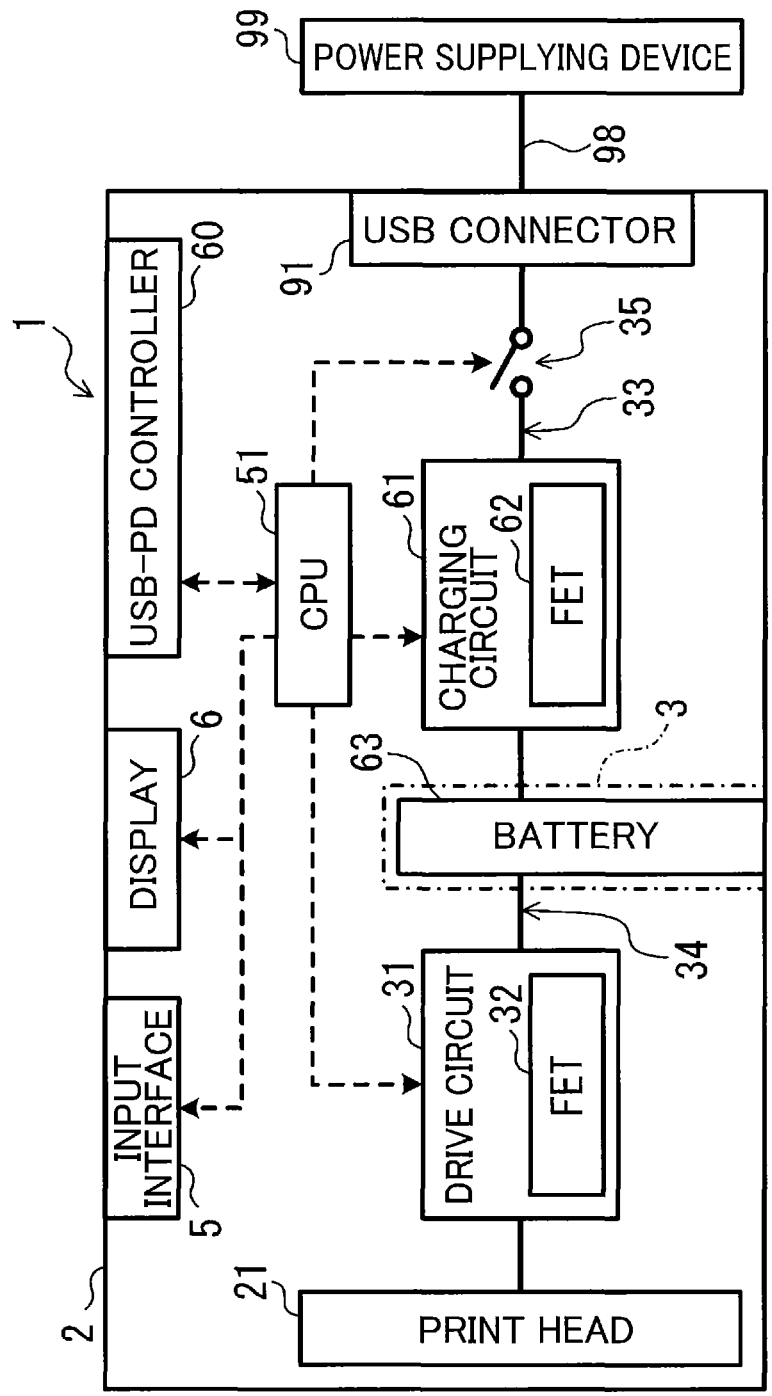
FIG. 1 is a block diagram illustrating electrical configuration concerning transmission of power in a power receiving device.

Below, a first embodiment of the present disclosure will be described while referring to the accompanying drawings. The referenced drawings will be used to describe the technical features made possible with the present disclosure. The structures of devices depicted in the drawings are not limited thereto but are merely illustrative examples.

Power Receiving Device 1

A power receiving device 1 is a thermal transfer printer that is driven by power stored in a battery 63. The power receiving device 1 can print characters (objects such as letters, symbols, numbers, and figures) on a print medium (a thermal label, for example). The power receiving device 1 charges the battery 63 using power received from a power supplying device 99.

Here, the structure of the power receiving device 1 will be described with reference to FIG. 1. The power receiving device 1 is provided with a casing 2. An input interface 5, a display 6, and a Universal Serial Bus (USB) connector 91 are provided on the surface of the casing 2. The input interface 5 can accept user operations. The display 6 is a liquid crystal display that displays various information. The USB connector 91 is a connection port for connecting to a USB device such as the power supplying device 99 via a cable 98 that conforms to the USB standard. The USB connector 91 relays power received from the power supplying device 99 into the power receiving device 1.

Inside the casing 2, the power receiving device 1 is provided with a battery compartment 3, a print head 21, a CPU 51, a USB Power Delivery (USB-PD) controller 60, a first line 33, and a second line 34. The battery 63 is removably mountable in the battery compartment 3. The battery 63 is a lithium-ion battery or an electric double-layer capacitor, for example. The print head 21 can print on a print medium by generating heat with power supplied from the battery 63. The print head 21 is an example of the print engine to print an image on the print medium.

The CPU 51 performs overall control of the power receiving device 1. When power can be supplied from the power supplying device 99 via the cable 98 in conformance with the USB-PD standard, the USB-PD controller 60 performs a negotiation with the power supplying device 99 for incoming power to be received from the power supplying device 99 under the control of the CPU 51.

The first line 33 connects the battery 63 mounted in the battery compartment 3 to the USB connector 91. The first line 33 transmits power relayed by the USB connector 91 to the battery 63 mounted in the battery compartment 3. The first line 33 is provided with a switch 35 and a charging circuit 61. The switch 35 is disposed upstream of the charging circuit 61 for the transmission of power along the first line 33 from the USB connector 91 to the battery 63.

The switch 35 switches between ON and OFF states in response to instructions outputted from the CPU 51. When the switch 35 is in the ON state, power relayed from the USB connector 91 is transmitted to the charging circuit 61 on the first line 33. When the switch 35 is in the OFF state, the first line 33 halts transmission of power from the USB connector 91 to the charging circuit 61.

The charging circuit 61 is an electronic circuit for controlling charging of the battery 63. The charging circuit 61 is provided with a field effect transistor (FET) 62, which is a switching element. The FET 62 may be a metal-oxide-semiconductor field-effect transistor (MOSFET), for example. The FET 62 switches between ON and OFF states according to instructions outputted from the CPU 51. When the FET 62 is in the ON state, power transmitted to the charging circuit 61 is further transmitted to the battery 63 along the first line 33. When the FET 62 is in the OFF state, the first line 33 halts the transmission of power from the charging circuit 61 to the battery 63.

The second line 34 connects the battery 63 mounted in the battery compartment 3 to the print head 21. Power discharged by the battery 63 is transmitted to the print head 21 along the second line 34. A drive circuit 31 is provided on the second line 34. The drive circuit 31 is an electronic circuit for controlling driving of the print head 21. The drive circuit 31 is provided with an FET 32, which is a switching element. The FET 32 is a MOSFET, for example. The FET 32 switches between ON and OFF states according to instructions outputted from the CPU 51. When the FET 32 is in the ON state, power discharged by the battery 63 is transmitted to the print head 21 along the second line 34. When the FET 32 is in the OFF state, the second line 34 halts the transmission of power from the battery 63 to the print head 21.

Power Supplying Device 99

The power supplying device 99 is a general-purpose personal computer, a portable terminal, or tablet computer, for example. The power supplying device 99 supplies power to the power receiving device 1 connected via the cable 98. Power that the power supplying device 99 supplies to the power receiving device 1 corresponds to any one of the USB standard operating modes shown in FIG. 2.

Electrical Configuration of the Power Receiving Device 1

Figure 3:
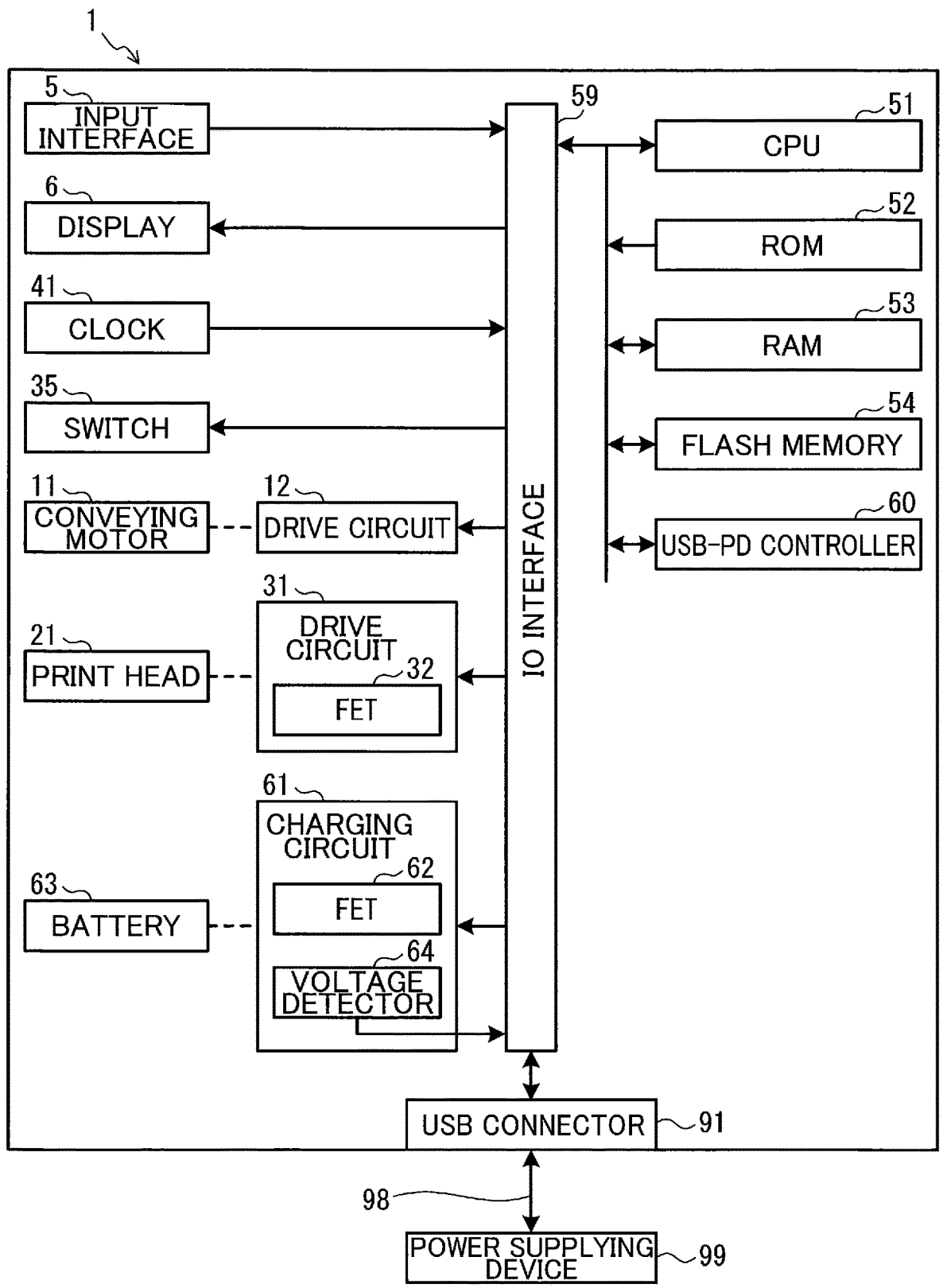
FIG. 3 is a block diagram illustrating electrical configuration of the power receiving device.

Next, the electrical configuration of the power receiving device 1 will be described with reference to FIG. 3. In addition to the CPU 51 and the USB-PD controller 60, the power receiving device 1 is provided with a ROM 52, a RAM 53, a flash memory 54, and an input/output interface 59 (hereinafter I/O interface 59). The ROM 52, the RAM 53, the flash memory 54, the USB-PD controller 60, and the I/O interface 59 are all electrically connected to the CPU 51.

The CPU 51 executes various programs for controlling the power receiving device 1. The ROM 52 stores various programs, dot patterns of characters to be printed, a first incoming power determination table 81 (see FIG. 6), a second incoming power determination table 82 (see FIG. 9), and a third incoming power determination table 83 (see FIG. 13). The RAM 53 temporarily stores flags such as a charged flag described later, the number of sheets the print head 21 is to print on print media, various calculation results, and the like. The flash memory 54 stores various settings for the power receiving device 1, a connection time counter 71 described later (see FIG. 5), a sheet number counter 72 (see FIG. 8), a time period counter 73 (see FIG. 12), and the like. The USB-PD controller 60 performs communications with the power supplying device 99 according to instructions outputted by the CPU 51.

Through the I/O interface 59, the CPU 51 is electrically connected to the input interface 5, the display 6, the switch 35, the drive circuit 31, the charging circuit 61, and the USB connector 91, as well as a clock 41 and a drive circuit 12. The input interface 5 inputs operations received from the user to the CPU 51. The display 6 displays various information in response to instructions outputted by the CPU 51. The clock 41 inputs a clock signal into the CPU 51 for measuring time. The switch 35 is switched between ON and OFF states in response to instructions outputted by the CPU 51.

The drive circuit 12 is electrically connected to a conveying motor 11. The CPU 51 controls the conveying motor 11 to convey a print medium by controlling the drive circuit 12. The drive circuit 31 is electrically connected to the print head 21. The drive circuit 31 is provided with the FET 32. The CPU 51 switches the FET 32 between ON and OFF states by controlling the drive circuit 31. The charging circuit 61 is electrically connected to the battery 63. The charging circuit 61 is provided with the FET 62, and a voltage detector 64. The CPU 51 switches the FET 62 between ON and OFF states by controlling the charging circuit 61. The voltage detector 64 detects the magnitude of voltage supplied from the charging circuit 61 to the battery 63 and inputs the detected voltage into the CPU 51. The voltage detector 64 may include a sensor to detect the magnitude of voltage.

The power receiving device 1 does not simultaneously charge the battery 63 and print with the print head 21. When charging the battery 63, the CPU 51 switches the switch 35 and FET 62 to their ON states and switches the FET 32 to its OFF state (see FIG. 1). The battery 63 is charged by power supplied from the power supplying device 99 via the first line 33. When the power receiving device 1 is printing on a print medium, the CPU 51 switches the switch 35 and FET 62 to their OFF states and switches the FET 32 to its ON state (see FIG. 1). The CPU 51 controls the print head 21 to print on the print medium while driving the conveying motor 11 to convey the print medium.

The power supplying device 99 is electrically connected to the CPU 51 and the USB-PD controller 60 via the USB connector 91 and I/O interface 59. When the power supplying device 99 supports the USB-PD standard shown in FIG. 2, the CPU 51 communicates with the power supplying device 99 via the USB-PD controller 60. In this case, the CPU 51 receives, from the power supplying device 99, power rules specifying the power that the power supplying device 99 can supply. Under control from the CPU 51, the USB-PD controller 60 issues a request to the power supplying device 99 for a desired level of incoming power given in the power rules to enable the power receiving device to receive the requested power from the power supplying device 99. In a case that the power supplying device 99 supports the USB standard mode other than the USB-PD standard as shown in FIG. 2, the CPU 51 receives desired power from the power supplying device 99 within the power range supported by one of the operating modes.

Process of the Power Receiving Device 1 up to the Beginning of Power Reception Next, steps in a process performed by the power receiving device 1 up until the power receiving device 1 begins to receive power from the power supplying device 99 will be described with reference to FIGS. 4 through 6. Before the power receiving device 1 begins to receive power, the FETs 32 and 62 and the switch 35 are all in their OFF states. The power receiving device 1 receives appropriate power from the power supplying device 99 in accordance with the operating condition of the power receiving device 1, which varies for each user. Examples of operating conditions are the connection time period, in which the power receiving device 1 is connected to the power supplying device 99, during a single charge of the battery 63, the number of sheets printed by the print head 21 by using power of the battery 63 charged by a single charge, and the frequency with which the print head 21 printed during the time period in which charging of the battery 63 was begun. The single or one charge indicates a charging operation of the battery 63 performed while the power supplying device 99 is continuously connected (remains connected) to the power receiving device 1. In the first embodiment, the power receiving device 1 receives an appropriate level of power from the power supplying device 99 in accordance with the connection time period in which the power receiving device 1 is continuously connected to the power supplying device 99 during one charge of the battery 63.

Figure 4:
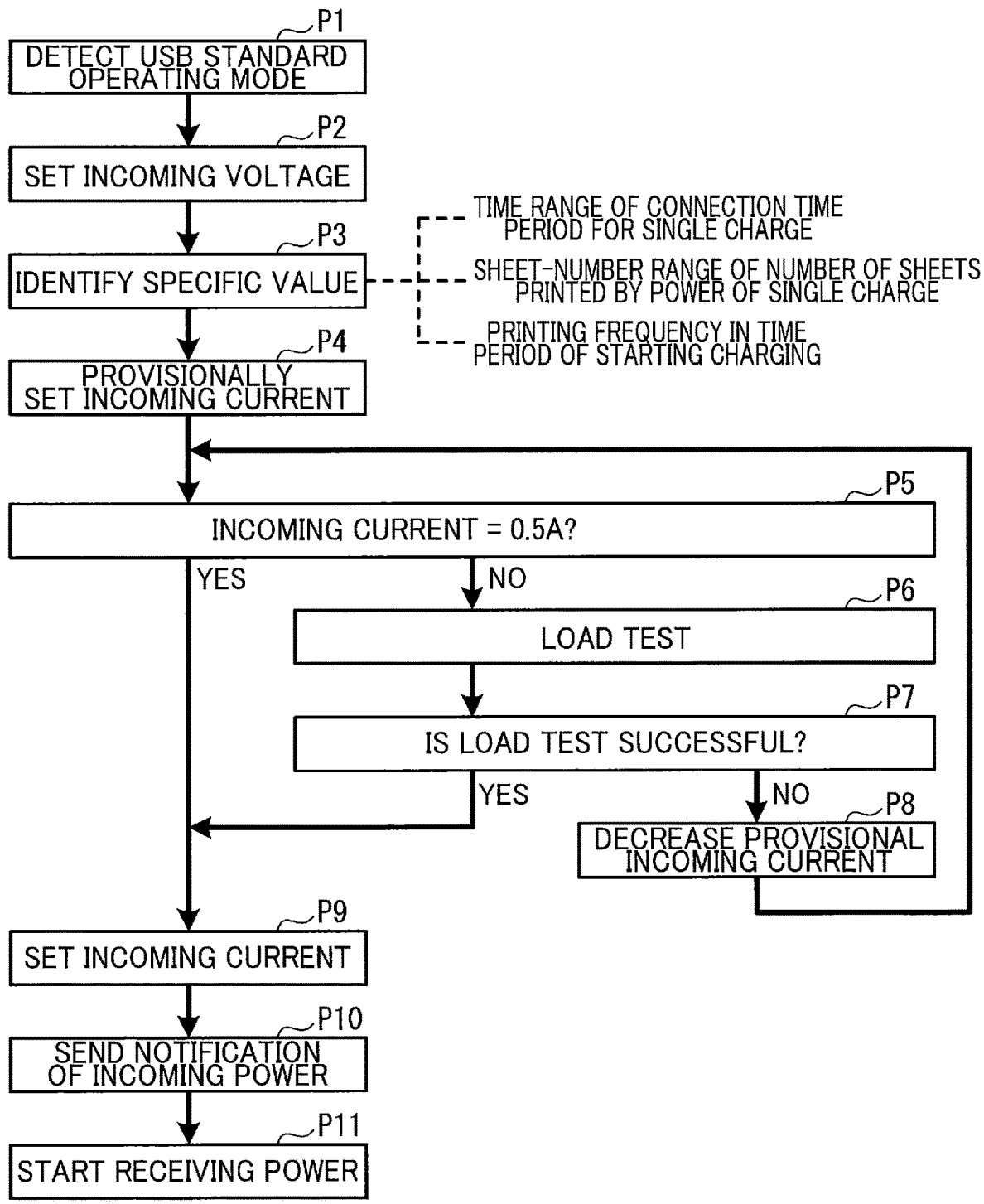
FIG. 4 is a flowchart conceptually illustrating a process for setting incoming power based on an operating condition of the power receiving device to start receiving electrical power.

When the power receiving device 1 is connected to the power supplying device 99 via the cable 98, in P1 shown in FIG. 4 the power receiving device 1 detects the USB standard operating mode of the power supplying device 99. In P2 the power receiving device 1 sets the incoming voltage based on the USB standard operating mode of the power supplying device 99 and the magnitude of power that the cable 98 can convey. The power receiving device 1 sets the incoming voltage to 15 V when the power supplying device 99 supports the USB-PD standard among the USB standard operating modes shown in FIG. 2. The power receiving device 1 sets the incoming voltage to 5 V when the power supplying device 99 supports any USB standard operating mode shown in FIG. 2 other than the USB-PD standard.

In P3 the power receiving device 1 identifies a specific value. The specific value is specific data indicating a specific numerical range related to the operating condition of the power receiving device 1. The power receiving device 1 identifies the specific value based on the operating condition. In the first embodiment, the power receiving device 1 identifies a specific value related to a connection time period based on past connection time periods in which the power receiving device 1 is continuously connected with the power supplying device 99. Here, each connection time period is for charging the battery 63 once.

In the first embodiment, the power receiving device 1 references the connection time counter 71 (see FIG. 5) to identify the specific value. The connection time counter 71 is stored in the flash memory 54. The connection time counter 71 counts the count value (number) for each range of a connection time period in which the power receiving device 1 is connected to the power supplying device 99. That is, the connection time period with the power supplying device 99 is measured each time the battery 63 is charged and the connection time counter 71 increments the count value corresponding to a range in which the measured period is included. Hereinafter, the ranges of connection times will be called time ranges. Time ranges in the connection time counter 71 include the range greater than or equal to 0 hours and less than 2 hours, the range greater than or equal to 2 hours and less than 3 hours, the range greater than or equal to 3 hours and less than 4 hours, and the range greater than or equal to 4 hours. The time ranges in the connection time counter 71 are examples of the candidate values. The candidate values are values candidate for the specific value.

To receive power from the power supplying device 99 at this time, the power receiving device 1 identifies the time range corresponding to the highest count value in the connection time counter 71 as the specific value. In the case of the connection time counter 71 shown in FIG. 5, the power receiving device 1 sets the specific value to the range greater than or equal to 3 hours and less than 4 hours since the count value "59" is the highest value among the count values.

In P4 the power receiving device 1 provisionally sets an incoming current based on both the USB standard operating mode of the power supplying device 99 detected in P1 and the specific value for the operating condition identified in P3. To determine the incoming current provisionally, the power receiving device 1 references the first incoming power determination table 81 stored in the ROM 52 (see FIG. 6). The first incoming power determination table 81 associates each USB standard operating mode with the supported voltage and values of current corresponding to the ranges of connection time period. For each USB standard in the table 81, the value of current becomes larger (or at least unchanged) as the connection time period indicated by the corresponding time range is longer. A combination of a USB standard operating mode, a corresponding supported voltage, and corresponding values of currents for the time ranges in the first incoming power determination table 81 is an example of the association information. For example, when the USB standard operating mode of the power supplying device 99 is the USB Type-C (3A) standard and the specific value identified for the operating condition is the range greater than or equal to 3 hours and less than 4 hours, the power receiving device 1 provisionally sets the incoming current to 1.0 A. By using the first incoming power determination table 81, the current provisionally set as the incoming current is smaller within the range of currents that can be outputted in the identified USB standard operating mode when the connection time period indicated by the time range of the specific value concerning the operating condition is larger. The incoming current provisionally set in P4 is an example of the provisional incoming power.

In P5 the power receiving device 1 determines whether the provisional incoming current is 0.5 A. 0.5 A is the smallest magnitude of current that can be transmitted over the cable 98, which is a USB cable.

When the provisional incoming current exceeds 0.5 A (P5: NO), in P6 the power receiving device 1 executes a load test. In the load test, the power receiving device 1 notifies the power supplying device 99 of the incoming voltage set in P2 and the incoming current provisionally set in P4. The power supplying device 99 outputs power the same as that specified in this notification to the power receiving device 1. The power receiving device 1 switches the switch 35 and FET 62 to their ON states for 1 second, and subsequently switches the switch 35 and FET 62 back to their OFF states. During the 1 second that the switch 35 and FET 62 are in the ON state, the power supplying device 99 supplies power to the battery 63. The power receiving device 1 detects the voltage supplied to the battery 63 using the voltage detector 64. The power receiving device 1 calculates voltage drop by subtracting the voltage detected with the voltage detector 64 from the incoming voltage specified in the notification sent from the power supplying device 99.

In P7 the power receiving device 1 determines whether the result of the load test was successful or unsuccessful based on the relationship between the voltage drop and a threshold value. The threshold value is a predetermined value based on the USB standard operating mode of the power supplying device 99 that was detected in P1. The power receiving device 1 determines that the load test was successful when the voltage drop is less than or equal to the threshold value and determines that the load test was unsuccessful when the voltage drop exceeds the threshold value.

When the power receiving device 1 determines that the load test was unsuccessful (P7: NO), in P8 the power receiving device 1 sets the new provisional incoming current to a value obtained by subtracting 0.5 A from the present provisionally set incoming current. Subsequently, the power receiving device 1 returns to P5 and determines again whether the new incoming current resulting from subtracting 0.5 A is 0.5 A.

When the incoming current is 0.5 A (P5: YES) or when an incoming current exceeding 0.5 A was determined to pass the load test (P7: YES), in P9 the power receiving device 1 sets the provisional incoming current as the confirmed incoming current for charging the battery 63. In other words, the incoming current is fixed to have a value of the provisional incoming current.

In P10 the power receiving device 1 notifies the power supplying device 99 of the incoming power through a combination of the incoming voltage set in P2 and the incoming current set in P9. In response, the power supplying device 99 outputs the incoming power (the incoming voltage and the incoming current) the same as that specified in this notification to the power receiving device 1 from the power receiving device 1. In P11 the power receiving device 1 switches the switch 35 and FET 62 to their ON states so that the incoming power is supplied from the power supplying device 99 to the battery 63.

First Power Reception Process

Figure 7:
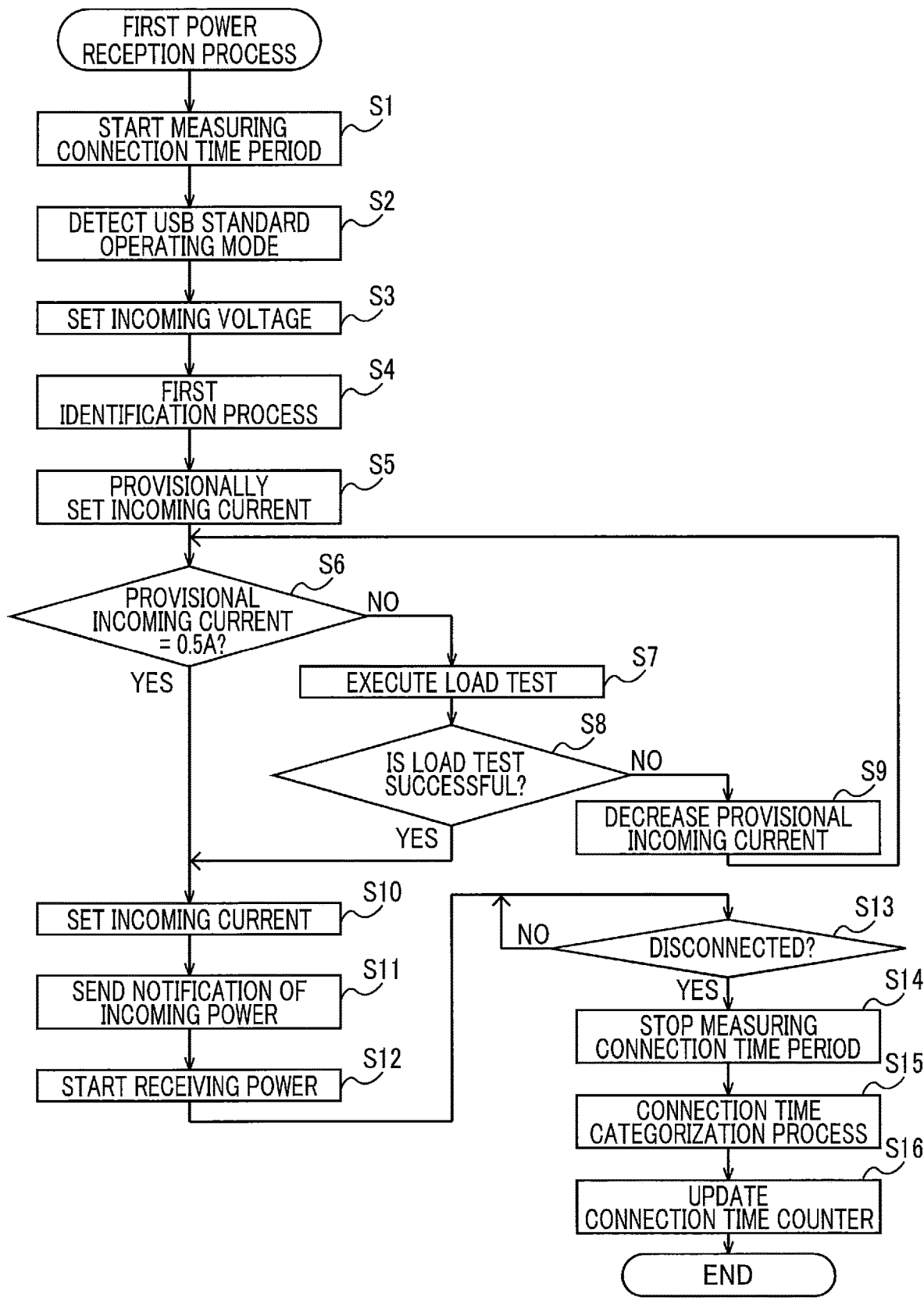
FIG. 7 is a flowchart illustrating a first power reception process.

Next, a first power reception process executed by the CPU 51 will be described with reference to FIG. 7. The first power reception process is a process illustrating the process of FIG. 4 more specifically. In the first power reception process, the power receiving device 1 receives power from the power supplying device 99 based on statistical information about the connection time periods each for a single charge of the battery 63. Here, each connection time period indicates a period from the time that the power receiving device 1 is continuously connected to the power supplying device 99 to charge the battery 63 and to the time that the power receiving device 1 is disconnected from the power supplying device 99. The single charge indicates a charge operation of the battery 63 during one connection time period. At the start of the first power reception process, the FETs 32 and 62 and the switch 35 are all in their OFF states. When the power supplying device 99 is connected to the USB connector 91 via the cable 98, the CPU 51 reads a program stored in the ROM 52 and executes the first power reception process according to this program.

In 51 at the beginning of the first power reception process, the CPU 51 begins measuring the connection time period in which the power receiving device 1 is connected with the power supplying device 99. In S2 the CPU 51 detects the USB standard operating mode of the power supplying device 99 through the cable 98. In S3 the CPU 51 sets the incoming voltage based on both the USB standard operating mode detected for the power supplying device 99 and the magnitude of power that the cable 98 can transmit.

In S4 the CPU 51 executes a first identification process. In the first identification process, the CPU 51 identifies the time range associated with the highest count value in the connection time counter 71 (see FIG. 5) as the specific value. In S5 the CPU 51 provisionally sets an incoming current based on the USB standard operating mode of the power supplying device 99 detected in S2, the specific value identified in S4, and the first incoming power determination table 81 stored in the ROM 52 (see FIG. 6). That is, the CPU 51 selects a current, as the provisional incoming current, that corresponds to the detected USB standard operating mode and the specific value in the first incoming power table 81.

In S6 the CPU 51 determines whether the incoming current provisionally set in S5 is 0.5 A. When the provisional incoming current is 0.5 A (S6: YES), the CPU 51 advances to S10 described later.

However, when the provisional incoming current exceeds 0.5 A (S6: NO), in S7 the CPU 51 executes the load test described above. In S8 the CPU 51 determines whether the load test was successful. When the voltage drop during the load test is less than or equal to a threshold value, the CPU 51 determines that the load test was successful (S8: YES) and advances to S10 described later.

However, when the voltage drop during the load test exceeds the threshold value, the CPU 51 determines that the load test was unsuccessful (S8: NO). In this case, in S9 the CPU 51 sets the new provisional incoming current to a value obtained by subtracting 0.5 A from the present provisional incoming current, and returns to the determination in S6. When the new incoming current resulting from subtracting 0.5 A is 0.5 A (S6: YES), the CPU 51 advances to S10 described later. However, when the new incoming current resulting from subtracting 0.5 A still exceeds 0.5 A (S6: NO), in S7 the CPU 51 executes the load test again.

In S10 the CPU 51 sets, as the confirmed incoming current, the incoming current to the value determined above (that is, the definitive incoming current is set to the value of the present provisional incoming current). In S11 the CPU 51 notifies the power supplying device 99 of the incoming power based on a combination of the incoming voltage and confirmed incoming current set above. The power supplying device 99 outputs power to the power receiving device 1 based on the notification received from the power receiving device 1. In S12 the CPU 51 switches the switch 35 and FET 62 to their ON states so that the incoming power specified by the CPU 51 in S11 begins to be supplied to the battery 63 from the power supplying device 99.

In S13 the CPU 51 determines whether the cable 98 was removed, disconnecting the power supplying device 99 from the power receiving device 1. The CPU 51 repeats the determination in S13 while the power supplying device 99 has not been disconnected (S13: NO). When the CPU 51 determines that the power supplying device 99 was disconnected (S13: YES), in S14 the CPU 51 stops measuring the connection time period begun in S1.

In S15 the CPU 51 executes a connection time categorization process. In the connection time categorization process, the CPU 51 categorizes the measured connection time period into the corresponding time range in the connection time counter 71. In S16 the CPU 51 increments by 1 the count value corresponding to the time range into which the connection time period was categorized in S15, and stores this new value in the flash memory 54 to update the connection time counter 71. Subsequently, the CPU 51 ends the first power reception process.

Operations and Effects of the First Embodiment

In the power receiving device 1 of the first embodiment, the flash memory 54 stores the connection time counter 71, which counts the count value for each range of the connection time period in which the power receiving device 1 is connected to the power supplying device 99, as the operating condition of the power receiving device 1. When the power receiving device 1 is connected to the power supplying device 99 via the cable 98, the CPU 51 of the power receiving device 1 detects the USB standard operating mode of the power supplying device 99 via the cable 98 (S2). The CPU 51 executes the first identification process to identify the time range associated with the largest count value among count values for all time ranges with respect to of the connection time periods in the connection time counter 71 as the specific value (S4). The CPU 51 sets the incoming current based on the USB standard operating mode detected for the power supplying device 99, the identified specific value, and the first incoming power determination table 81 stored in the ROM 52 (S5-S10).

According to this embodiment, the power receiving device 1 stores, as a past operating condition, the connection time counter 71, which is used to categorize the connection time periods for individual charges of the battery 63. The power receiving device 1 detects the USB standard operating mode, which is the power supplying capacity of the power supplying device 99. The power receiving device 1 sets the incoming power based on a specific value concerning the connection time period, in which the power receiving device is connected to the power supplying device 99, within the range of power that the power supplying device 99 can supply. This enables the power receiving device 1 to receive appropriate power in accordance with the operating condition.

The power receiving device 1 uses past connection time periods each used for a single charge of the battery 63, as the operating condition of the power receiving device 1. Here, in each past connection time period, the power receiving device was continuously connected to the power supplying device 99. The power receiving device 1 sets the incoming power based on these past connection time periods. This enables the power receiving device 1 to charge the battery 63 with appropriate power based on past connection time periods each used for a single charge of the battery 63.

In the first incoming power determination table 81, the incoming current is set to a smaller current within the range of currents that can be outputted in the USB standard operating mode when the specific value of the operating condition indicates the connection time periods were longer (the connection time periods have tendency to become fewer). When prior connection time periods have been long, the user is unlikely to stop charging the battery 63 in order to operate the power receiving device 1 immediately after charging of the battery 63 has begun. Therefore, the power receiving device 1 can sufficiently charge the battery 63 with low incoming power so as not to generate heat in the battery 63.

When charging the battery 63, the CPU 51 executes a connection time categorization process to categorize a measured connection time period, in which the power receiving device is connected to the power supplying device 99, into a corresponding time range among the plurality of time ranges in the connection time counter 71 (S15). The CPU 51 increments by 1 the count value of the time counter 71 corresponding to the time range into which the connection time period was sorted and stores the new count value in the flash memory 54 to update the connection time counter 71 (S16). In the first identification process, the CPU 51 identifies the time range of the connection time period having the highest count value among count values for all time ranges in the connection time counter 71 as the specific value (S4). When charging the battery 63, the battery 63 is likely to be charged for a connection time period included in the time range corresponding to the highest count value in the connection time counter 71. Therefore, the power receiving device 1 sets the incoming power based on the connection time period of the time range having the highest count value in the connection time counter 71. This enables the power receiving device 1 to charge the battery 63 with appropriate power.

The CPU 51 sets the incoming current based on the USB standard operating mode of the power supplying device 99 detected via the cable 98, the specific value identified from the operating condition, and the first incoming power determination table 81 stored in the ROM 52. This enables the power receiving device 1 to receive appropriate power based on the operating condition through a simple method.

The CPU 51 provisionally sets an incoming current based on the USB standard operating mode of the power supplying device 99 detected via the cable 98, the specific value identified from the operating condition, and the first incoming power determination table 81 stored in the ROM 52 (S5). The CPU 51 executes a load test to calculate voltage drop (S7). The CPU 51 determines whether the load test was successful by determining whether the voltage drop exceeds a threshold (S8). When the CPU 51 determines that the load test executed at the provisionally set incoming current was unsuccessful due to the voltage drop exceeding the threshold, the CPU 51 sets the incoming current to a value obtained by subtracting 0.5 A from the provisionally set incoming current (S9). When the CPU 51 determines that the load test executed at the provisional incoming current was successful due to the voltage drop being less than or equal to the threshold, the CPU 51 sets the provisional incoming current as the confirmed incoming current (S10). This process prevents the power receiving device 1 from receiving excessive power from the power supplying device 99.

Variations of the First Embodiment

The first embodiment is not limited to the above description but may be modified in various ways. The method by which the power receiving device 1 identifies the specific value in the first identification process may be modified as appropriate. For example, in the first identification process the power receiving device 1 may calculate an average value of past connection time periods, in which the power receiving device is connected to the power supplying device 99, and may identify this average value as the specific value. In this case, the flash memory 54 stores a measured connection time period for charging the battery 63 in which the power receiving device is connected to the power supplying device 99 each time the charging is executed, and the power receiving device 1 sets the incoming power based on the average value of the past connection time periods. In this case, the incoming current or power is smaller when the average value is larger. This method prevents the battery 63 from receiving excessive power. Accordingly, the power receiving device 1 can charge the battery 63 with appropriate power.

In the first embodiment, the CPU 51 determines that the load test failed when the voltage drop exceeds a threshold value. However, the CPU 51 may determine that the load test failed when the voltage drop is greater than or equal to a threshold value.

Second Embodiment

Next, a second embodiment of the present disclosure will be described. The power receiving device 1 according to the second embodiment differs from the power receiving device 1 according to the first embodiment in that the power receiving device 1 uses statistical information about the numbers of sheets printed by the print head 21 (the number of printed sheets) by power of the battery 63 charged by a single charge (by power of the battery 63 during two successive single charges) as the operating condition; the power receiving device 1 executes a second power reception process to receive power from the power supplying device 99; and the power receiving device 1 executes a first printing process. In the following description, structures of the power receiving device 1 having the same functions described in the first embodiment and steps identical to those in the first power reception process are designated with the same reference numerals and step numbers used in the first embodiment, and descriptions of these structures and steps are omitted or simplified.

Processes in the second embodiment for identifying the operating condition and setting a provisional current will be described with reference to FIGS. 4, 8, and 9. In P3 of FIG. 4, the power receiving device 1 according to the second embodiment identifies a specific value concerning the numbers of sheets printed by the power of the battery 63 charged by a single charge (by the power of the battery 63 during two successive charges) on the basis of the sheet number counter 72 (see FIG. 8).

The sheet number counter 72 is stored in the flash memory 54. The sheet number counter 72 counts a count value for each range concerning the number of sheets printed by the power of the battery 63 charged by a single charge (by the power of the battery 63 during two successive charges). Hereinafter, the numerical ranges of printed sheets will be called sheet-number ranges. The sheet-number ranges given in the sheet number counter 72 are the range from 0 to 5 sheets, the range from 6 to 10 sheets, the range from 11 to 15 sheets, and the range of 16 sheets or greater. The sheet-number range is an example of the print-amount range indicating the range with respect to the amount of printed matters such as printed sheets. The sheet-number ranges in the sheet number counter 72 are examples of the candidate values.

The power receiving device 1 sets the sheet-number range associated with the highest count value among count values for all sheet-number ranges in the sheet number counter 72 as the specific value for the operating condition. That is, the specific value indicates the sheet-number range concerning the number of sheets associated with the highest count value. In the case of the sheet number counter 72, the power receiving device 1 sets the specific value to the sheet-number range from 11 to 15 sheets which is associated with the highest count value "47".

In P4 of FIG. 4, the power receiving device 1 provisionally sets the incoming current based on the USB standard operating mode detected for the power supplying device 99, the specific value identified from the operating condition, and the second incoming power determination table 82 (see FIG. 9). The second incoming power determination table 82 is stored in the ROM 52. The second incoming power determination table 82 associates each USB standard operating mode with the supported voltage and values of current corresponding to the sheet-number ranges. For each USB standard in the table 82, the value of current becomes larger (or at least unchanged) as the sheet-number range indicates that the number of sheets is larger. A combination of a USB standard operating mode, a corresponding supported voltage, and corresponding values of currents for the sheet-number ranges in the second incoming power determination table 82 is an example of the association information. For example, when the USB standard operating mode of the power supplying device 99 is the USB Type-C (3A) standard and the specific value identified for the operating condition is 11-15 sheets, the power receiving device 1 provisionally sets the incoming current to 1.5 A. By using the second incoming power determination table 82, the current provisionally set as the incoming current is smaller within the range of currents that can be outputted in the identified USB standard operating mode when the number of sheets indicated by the sheet-number range, which is the specific value of the operating condition, is smaller.

Second Power Reception Process

Figure 10:
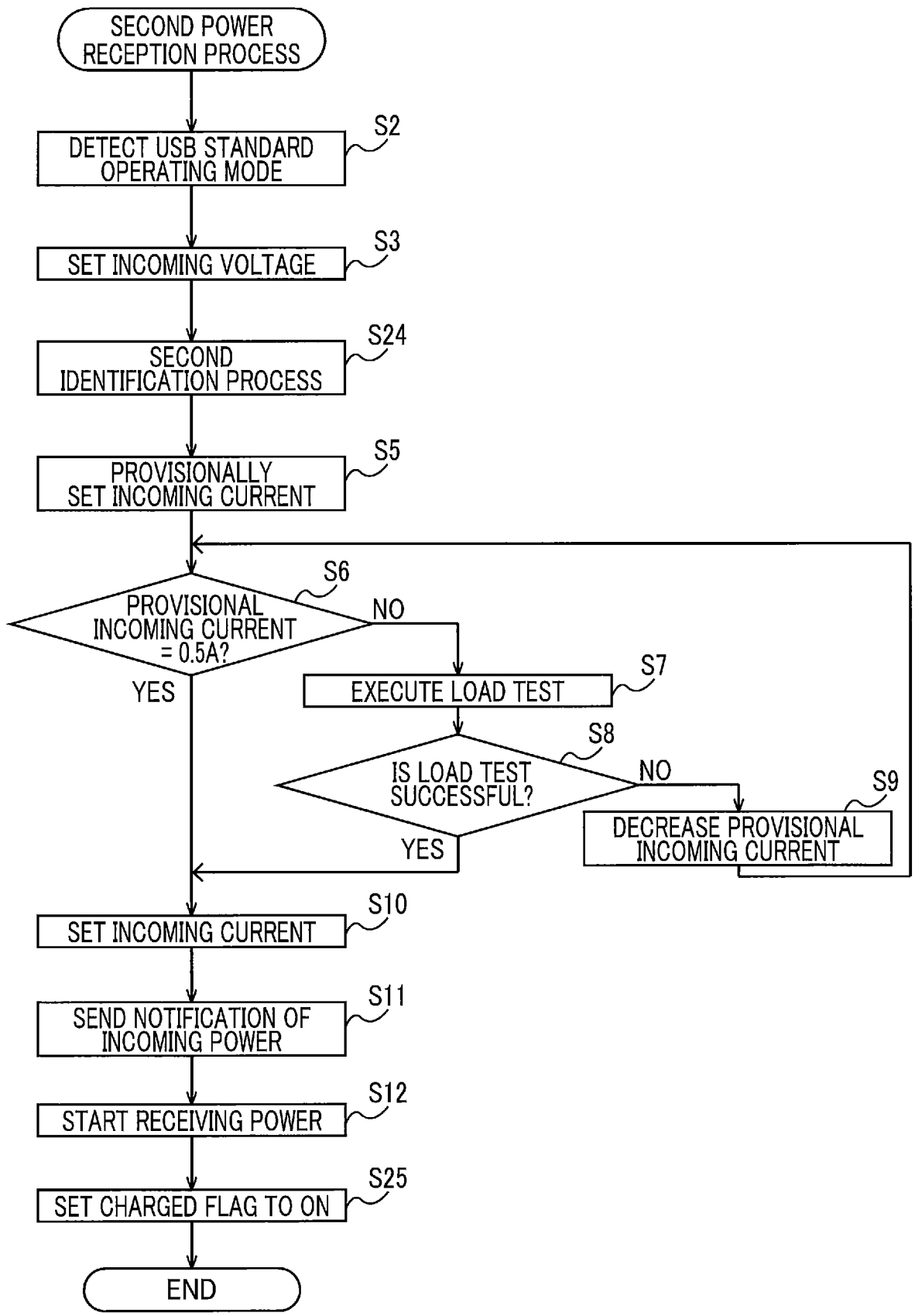
FIG. 10 is a flowchart illustrating a second power reception process.

Next, a second power reception process executed by the CPU 51 will be described with reference to FIG. 10. The second power reception process is a process illustrating the process of FIG. 4 more specifically. In the second power reception process, the power receiving device 1 receives power from the power supplying device 99 based on the numbers of sheets printed by the print head 21 using power of the battery 63 charged by a single charge (using power of the battery 63 during two successive charges). At the start of the second power reception process, the FETs 32 and 62 and the switch 35 are all in their OFF states. When the power supplying device 99 is connected to the USB connector 91 via the cable 98, the CPU 51 reads a program stored in the ROM 52 and executes the second power reception process.

In S2 at the beginning of the second power reception process, the CPU 51 detects the USB standard operating mode of the power supplying device 99. In S3 the CPU 51 sets the incoming voltage.

In S24 the CPU 51 executes a second identification process. In the second identification process, the CPU 51 identifies the sheet-number range having the highest count value among count values for all sheet-number ranges in the sheet number counter 72 (see FIG. 8) as the specific value. In S5 the CPU 51 provisionally sets the incoming current based on the USB standard operating mode detected for the power supplying device 99, the specific value identified in S24, and the second incoming power determination table 82 stored in the ROM 52 (see FIG. 9).

In S6 the CPU 51 determines whether the incoming current provisionally set in S5 is 0.5 A. When the provisional incoming current is 0.5 A (S6: YES), the CPU 51 advances to S10. However, when the provisional incoming current exceeds 0.5 A (S6: NO), in S7 the CPU 51 executes the load test. In S8 the CPU 51 determines whether the load test executed in S7 was successful. When the CPU 51 determines that the load test was successful (S8: YES), the CPU 51 advances to S10. However, when the CPU 51 determines that the load test was unsuccessful (S8: NO), in S9 the CPU 51 sets the new provisional incoming current to a value obtained by subtracting 0.5 A from the present provisionally set incoming current and returns to the determination in S6.

In S10 the CPU 51 sets the incoming current to the value determined above, as the confirmed incoming current. In S11 the CPU 51 notifies the power supplying device 99 of the incoming power using a combination of the incoming voltage and confirmed incoming current set above. The power supplying device 99 outputs to the power receiving device 1 power specified in the notification received from the power receiving device 1. In S12 the CPU 51 switches the switch 35 and FET 62 to their ON states so that the incoming power begins to be supplied to the battery 63.

In S25 the CPU 51 sets a charged flag stored in the RAM 53 to ON. The charged flag is set to ON by storing a "1" as its value when the battery 63 has been charged and is set to OFF by storing a "0" as its value when printing by the print head 21 is performed after the battery 63 was charged. Subsequently, the CPU 51 ends the second power reception process.

First Printing Process

Figure 11:
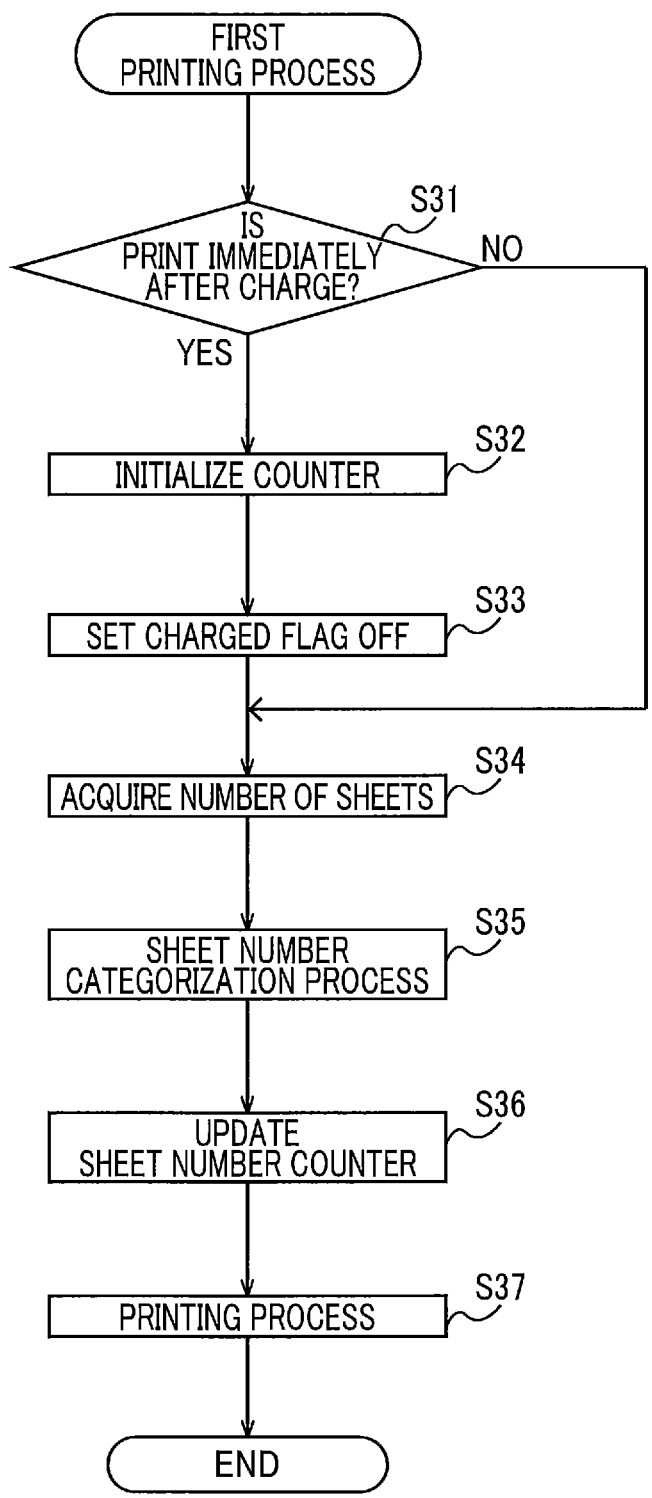
FIG. 11 is a flowchart illustrating a first printing process.

The first printing process executed by the CPU 51 will be described with reference to FIG. 11. In the first printing process, the power receiving device 1 according to the second embodiment performs a print on a print medium with the print head 21. At the start of the first printing process, the power receiving device 1 and the power supplying device 99 are not connected via the cable 98 and the FETs 32 and 62 and the switch 35 are all in their OFF states. When the user operates the input interface 5 to issue an instruction to execute the first printing process, the CPU 51 reads a program from the ROM 52 and executes the first printing process.

In S31 at the beginning of the first printing process, the CPU 51 determines whether the current print is being performed immediately after the battery 63 was charged. The CPU 51 makes the determination in S31 based on the charged flag stored in the RAM 53. When the charged flag is ON, then the current printing is being performed immediately after the battery 63 was charged (S31: YES). Accordingly, in S32 the CPU 51 initializes all the values of the sheet number counter 72 stored in the flash memory 54 (see FIG. 8) to 0. In S33 the CPU 51 sets the charged flag stored in the RAM 53 to OFF and advances to S34. On the other hand, when the charged flag is OFF, in S31 the CPU 51 determines that this printing is not being performed immediately after charging the battery 63 (S31: NO), and the CPU 51 advances directly to S34.

In S34 the CPU 51 acquires the number of sheets to be printed by the print head 21 from the RAM 53. In S35 the CPU 51 executes a sheet number categorization process. In the sheet number categorization process, the CPU 51 categorizes the number of sheets acquired in S34 into the corresponding sheet-number range in the sheet number counter 72. In S36 the CPU 51 increments by 1 the count value associated with the sheet-number range into which the number of sheets was categorized in S35 and stores this value in the flash memory 54 to update the sheet number counter 72. In S37 the CPU 51 executes a printing process. In the printing process, the CPU 51 drives the conveying motor 11 and the print head 21 to print on print media of the number of sheets acquired in S34 while conveying the print media.

Operations and Effects of the Second Embodiment

The power receiving device 1 according to the second embodiment uses past numbers of sheets printed by the print head 21 by power of the battery 63 charged in a single charge as the operating condition for the power receiving device 1. The power receiving device 1 uses the print head 21 to print on print media after the battery 63 has been charged. The power receiving device 1 sets the incoming power based on the past numbers of sheets printed by using power of the battery 63 charged by one charge. This enables the power receiving device 1 to charge the battery 63 with appropriate power based on the numbers of sheets printed by using power of the battery 63 charged by a single charge.

In the second incoming power determination table 82, the incoming current is set to a smaller current within the range of currents that can be outputted in the USB standard operating mode when the specific value of the operating condition indicates that the numbers of printed sheets were fewer (the numbers of printed sheets have tendency to become fewer). When prior numbers of sheets printed using power of the battery 63 charged by a single charge have been few, the user is likely to charge the battery 63 frequently. Therefore, the power receiving device 1 can print using the print head 21, even if the level of power used in one charge of the battery 63 is low. Accordingly, the power receiving device 1 can charge the battery 63 to an extent that heat will not be generated in the battery 63 but the print head 21 will still be able to print.

When executing the first printing process, the CPU 51 executes the sheet number categorization process to categorize the current number of sheets to be printed into the corresponding sheet-number range in the sheet number counter 72 (S35). The CPU 51 increments by 1 the count value corresponding to the sheet-number range into which the number of sheets being printed was sorted and stores this number in the flash memory 54 to update the sheet number counter 72 (S36). In the second identification process, the CPU 51 identifies the sheet-number range having the highest count value among count values for all sheet-number ranges in the sheet number counter 72 as the specific value (S24). In the first printing process, the number of sheets to be printed by the power receiving device 1 is likely within the sheet-number range corresponding to the highest count value in the sheet number counter 72. Accordingly, the power receiving device 1 sets the incoming power based on the sheet-number range having the highest count value in the sheet number counter 72, enabling the power receiving device 1 to charge the battery 63 with appropriate power.

Variations of the Second Embodiment

The second embodiment is not limited to the above description but may be modified in various ways. The method by which the power receiving device 1 identifies the specific value in the second identification process may be modified as appropriate. For example, in the second identification process the power receiving device 1 may calculate an average value of numbers of sheets printed using the power of the battery 63 charged by the single charge (using the power of the battery 63 during two successive charges), and may identify this average value as the specific value. In this case, the flash memory 54 stores the number of sheets of print media that the print head 21 prints each time the first printing process is executed. The power receiving device 1 sets the incoming power based on the average number of sheets printed in one first printing process. In this case, the incoming current or power is smaller when the average number of sheets is smaller. This method prevents the battery 63 from receiving excessive incoming power relative to the power consumed in the battery 63 by printing. Accordingly, the power receiving device 1 can charge the battery with appropriate power.

As another example of identifying the specific value, the power receiving device 1 may acquire the maximum number of sheets to date among the numbers of sheets each indicates the number of sheets which were printed through one first printing process by using power of the battery 63 charged by a common single charge (that is, all the numbers of sheets is printed by using the power of the battery 63 after a single charge and before another charge next to the single charge) in the second identification process and may identify this maximum value as the specific value. In this case, the flash memory 54 stores the number of sheets of print media that the print head 21 prints each time the first printing process is executed. The power receiving device 1 sets the incoming power based on the maximum number of sheets printed to date in the first printing process. In the first printing process, the power receiving device 1 is likely to print fewer sheets than this maximum number. This method prevents the battery 63 from receiving excessive incoming power, thereby enabling the power receiving device 1 to charge the battery 63 with appropriate power. The maximum number of sheets is an example of the maximum print amount.

The operating condition in the second embodiment may be related to any quantity that the print head 21 prints on print media. For example, the operating condition in the second embodiment may be the numbers of dots in images printed by power of the battery charged by one common charge. Here, each of the numbers of dots indicates the number of dots which were printed on print media through the first printing process. Alternatively, the operating condition in the second embodiment may be the numbers of times. Here, each of the numbers of times indicates the number of times the first printing process was executed by using power of the battery 63 charged by a different single charge (that is, each number of times was executed by using power of the battery 63 during a different pair of successive charges).

Third Embodiment

Next, a third embodiment of the present disclosure will be described. The power receiving device 1 according to the third embodiment differs from the power receiving device 1 according to the first and second embodiments in that the power receiving device 1 executes a third power reception process to receive power from the power supplying device 99, and the operating condition for the power receiving device 1 is the number of times that the print head 21 has printed (printing frequency (%)) during each of time period in which charging of the battery 63 was started. In the following description, structures of the power receiving device 1 having the same functions described in the first and second embodiments and steps identical to those in the first and second power reception processes and the first printing process are designated with the same reference numerals and step numbers used in the first and second embodiments, and descriptions of these structures and steps are omitted or simplified.

Processes in the third embodiment for identifying the operating condition and setting a provisional current will be described with reference to FIGS. 4, 12, and 13. The power receiving device 1 according to the third embodiment identifies a specific value for the number of prints (printing frequencies (%)) within time periods in which charging of the battery 63 was started. The specific value is identified based on a first operating condition and a second operation. The first operating condition is the number of times that printing has been performed (printing frequency (%)) during each time period throughout the day. The second operating condition is the time that the current connection of the power receiving device 1 to the power supplying device 99 was established (connection start time) for charging the battery 63.

In P3 of FIG. 4, the power receiving device 1 according to the third embodiment identifies a specific value related to printing frequencies with respect to printing performed using power of the battery 63 charged in a single charge based on the time period counter 73 (using power of the battery 63 during two successive charges) (see FIG. 12). The time period counter 73 is stored in the flash memory 54. The time period counter 73 counts the number of prints performed during each time period throughout the day. Here, the numbers of prints (their frequencies (%)) serve as the first operating condition. In the third embodiment, the hours of a day are divided into time periods of three hours each: 0:00-3:00, 3:00-6:00, 6:00-9:00, . . . , 18:00-21:00, and 21:00-24:00. The time period counter 73 stores the total number of prints and the printing frequency (%) for each time period derived from this total number and the number of prints counted for each time period. The time periods in the time period counter 73 are examples of the candidate values.

The power receiving device 1 acquires the connection start time, which is the second operating condition, based on the clock 41. The connection start time may be a present time specified by the clock 41. The power receiving device 1 categorizes the connection start time into the corresponding time period in the time period counter 73. The power receiving device 1 identifies the printing frequency (%) for the time period in the time period counter 73 into which the connection start time was categorized as the specific value. For example, when the connection start time is 17:00, the power receiving device 1 determines that the specific value is 23.6% corresponding to the time period 15:00-18:00.

In P4 of FIG. 4, the power receiving device 1 provisionally sets the incoming current based on the USB standard operating mode detected for the power supplying device 99, the specific value identified from the operating condition, and the third incoming power determination table 83 (see FIG. 13). The third incoming power determination table 83 is stored in the ROM 52. The third incoming power determination table 83 associates each USB standard operating mode with the supported voltage and values of current corresponding to the printing frequencies (%). For each USB standard in the table 82, the value of current becomes larger (or at least unchanged) as the printing frequency (%) is larger. A combination of a USB standard operating mode, a corresponding supported voltage, and corresponding values of currents for printing frequencies in the third incoming power determination table 83 is an example of the association information. For example, when the USB standard operating mode of the power supplying device 99 is the USB Type-C (3A) standard and the identified specific value of the operating condition is 32.7%, the power receiving device 1 provisionally sets the incoming current to 3.0 A. The current provisionally set as the incoming current in the third incoming power determination table 83 is smaller within the range of currents that can be outputted in the identified USB standard operating mode when the printing frequency (%) for the time period in which the connection start time was categorized is smaller.

Third Power Reception Process

Figure 14:
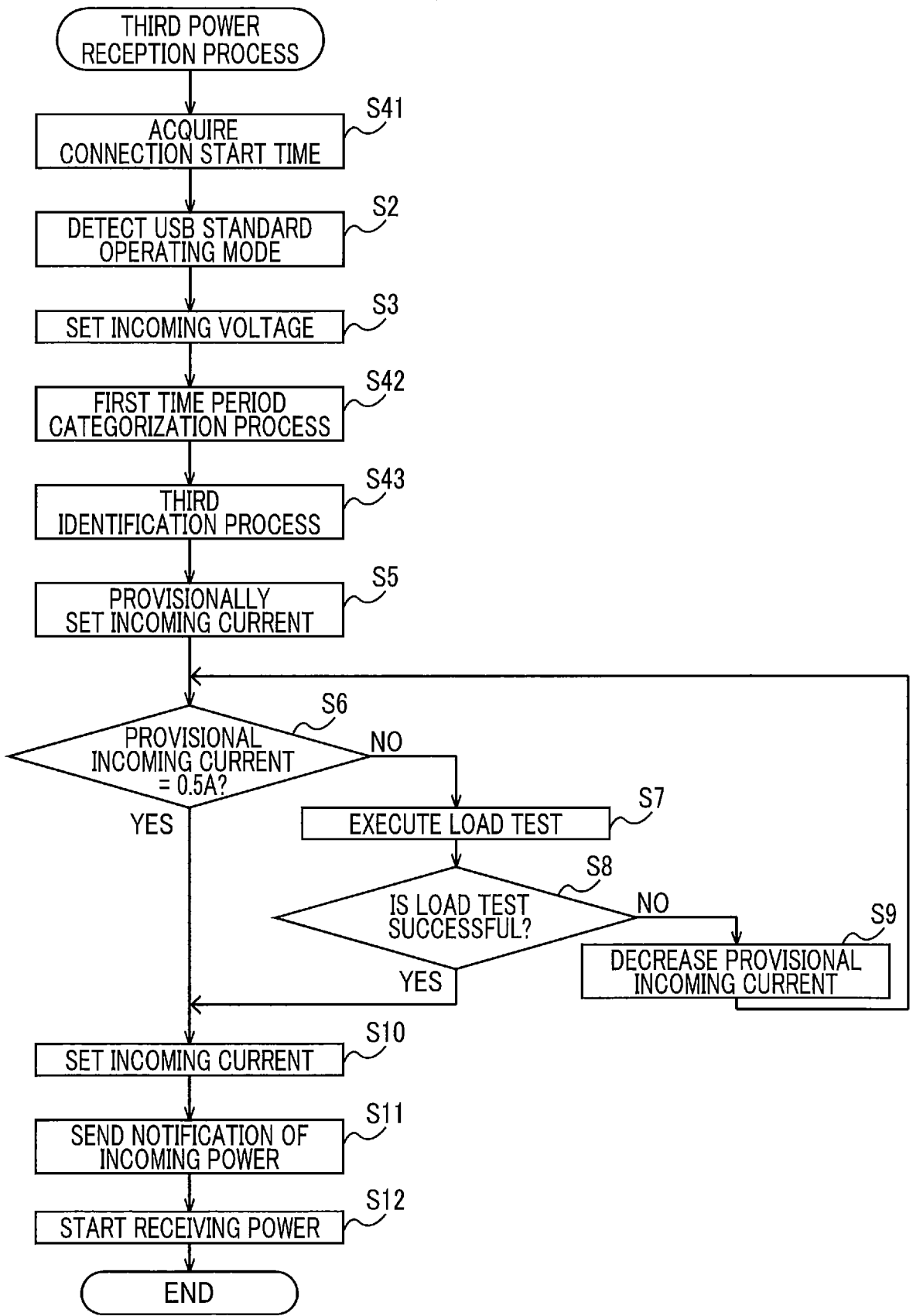
FIG. 14 is a flowchart illustrating a third power reception process.

Next, the third power reception process executed by the CPU 51 will be described with reference to FIG. 14. The third power reception process is a process illustrating the process of FIG. 4 more specifically. In the third power reception process, the power receiving device 1 receives power from the power supplying device 99 based on the printing frequency for the time period in which the connection start time is categorized, where both the printing frequency and the connection start time are operating conditions of the power receiving device 1. At the start of the third power reception process, the FETs 32 and 62 and the switch 35 are all in their OFF states. When the power supplying device 99 is connected to the USB connector 91 via the cable 98, the CPU 51 reads a program stored in the ROM 52 and executes the third power reception process.

In S41 at the beginning of the third power reception process, the CPU 51 acquires the connection start time based on the clock 41. In S2 the CPU 51 detects the USB standard operating mode of the power supplying device 99. In S3 the CPU 51 sets the incoming voltage. The connection start time is an example of the present operating condition. That is, the present operating condition indicates a present status of the power receiving device 1.

In S42 the CPU 51 executes a first time period categorization process. In the first time period categorization process, the CPU 51 categorizes the connection start time acquired in S41 into the corresponding time period in the time period counter 73 (see FIG. 12).

In S43 the CPU 51 executes a third identification process. In the third identification process, the CPU 51 identifies the specific value to be the printing frequency for the time period in the time period counter 73 into which the connection start time was categorized. In S5 the CPU 51 provisionally sets the incoming current based on the USB standard operating mode detected for the power supplying device 99, the specific value identified in S43, and the third incoming power determination table 83 stored in the ROM 52 (see FIG. 13).

In S6 the CPU 51 determines whether the incoming current provisionally set in S5 is 0.5 A. When the provisional incoming current is 0.5 A (S6: YES), the CPU 51 advances to S10. However, when the provisional incoming current exceeds 0.5 A (S6: NO), in S7 the CPU 51 executes the load test. In S8 the CPU 51 determines whether the load test executed in S7 was successful. When the CPU 51 determines that the load test was successful (S8: YES), the CPU 51 advances to S10. However, when the CPU 51 determines that the load test was unsuccessful (S8: NO), in S9 the CPU 51 sets the new provisional incoming current to a value obtained by subtracting 0.5 A from the present provisionally set incoming current and returns to the determination in S6.

In S10 the CPU 51 sets the incoming current to the value determined above, as the confirmed incoming current. In S11 the CPU 51 notifies the power supplying device 99 of the incoming power based on a combination of the incoming voltage and confirmed incoming current set above. In response, the power supplying device 99 outputs to the power receiving device 1 power specified in the notification received from the power receiving device 1. In S12 the CPU 51 switches the switch 35 and FET 62 to their ON states so that the incoming power begins to be supplied to the battery 63. Subsequently, the CPU 51 ends the third power reception process.

Second Printing Process

Figure 15:
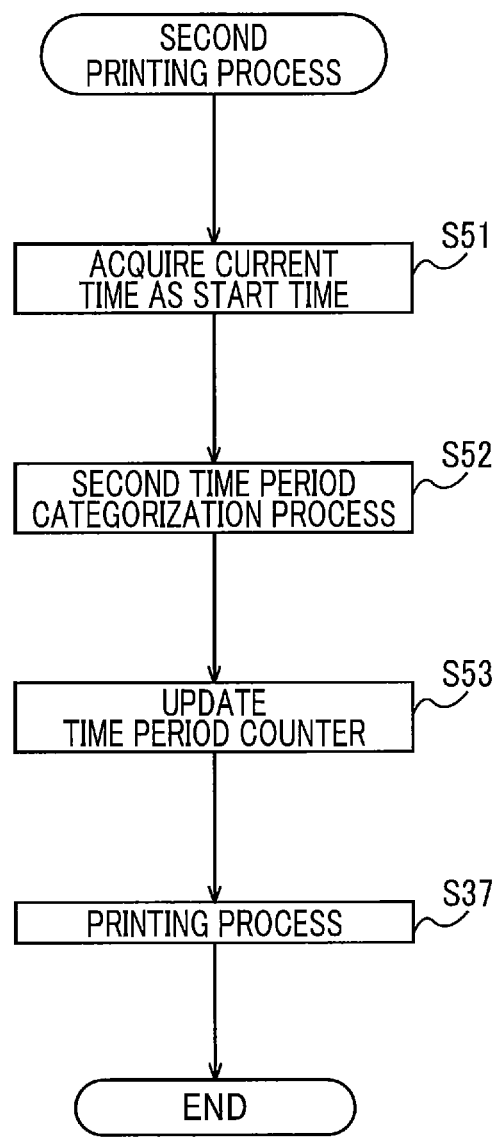
FIG. 15 is a flowchart illustrating a second printing process.

The second printing process executed by the CPU 51 will be described with reference to FIG. 15. In the second printing process, the power receiving device 1 according to the third embodiment performs a print on a print medium with the print head 21. At the start of the second printing process, the power receiving device 1 and the power supplying device 99 are not connected via the cable 98 and the FETs 32 and 62 and the switch 35 are all in their OFF states. When the user operates the input interface 5 to issue an instruction to execute the second printing process, the CPU 51 reads a program from the ROM 52 and executes the second printing process.

In S51 at the beginning of the second printing process, the CPU 51 acquires the time at which the second printing process was started (printing start time) based on the clock 41. The connection start time may be a present time specified by the clock 41. In S52 the CPU 51 executes a second time period categorization process. In the second time period categorization process, the CPU 51 categorizes the printing start time acquired in S51 into the corresponding time period in the time period counter 73 (see FIG. 12).

In S53 the CPU 51 updates the time period counter 73. To update the time period counter 73, the CPU 51 increments by 1 the count value corresponding to the time period into which the printing start time was categorized in S52. The CPU 51 also increments the total number of print media that have been printed. The CPU 51 derives each printing frequency (%) based on the total number of prints and the count value for the corresponding time period. The CPU 51 stores the time period counter 73 with the updated count value for the time period, updated total print number, and updated printing frequencies (%) for the time periods in the flash memory 54.

In S37 the CPU 51 executes a printing process. In the printing process, the CPU 51 drives the conveying motor 11 and print head 21 to print on print media while conveying the print media.

Operations and Effects of the Third Embodiment

With the power receiving device 1 according to the third embodiment, the CPU 51 acquires a connection start time when charging the battery 63 (S41). The CPU 51 executes the third identification process (S43). In the third identification process, the CPU 51 uses the connection start time as the second operating condition and identifies, as the specific value, the printing frequency (%) for the time period into which the connection start time was categorized. Thus, the printing frequency (%) for the time period in which charging of the battery 63 is started, as the specific value of the first operating condition, is based on the number of prints performed in each time period (the first operating condition) and the connection start time (the second operating condition). Therefore, the power receiving device 1 can receive appropriate power based on two operating conditions.

The power receiving device 1 uses the number of prints (printing frequency (%)) of each time period as the first operating condition and the connection start time as the second operating condition. In the third power reception process, the power receiving device 1 executes the first time period categorization process to categorize the connection start time into the corresponding time period in the time period counter 73 (S42). In the third identification process, the CPU 51 identifies the specific value as the printing frequency (%) for the time period into which the connection start time was categorized (S43). This enables the power receiving device 1 to charge the battery with appropriate power according to the printing frequencies for the time periods in which the power supplying device 99 was connected to the power receiving device 1.

The printing frequency (%) for the time period into which the connection start time is categorized, which is the specific value of the operating condition, is smaller when the number of prints performed during that time period is fewer. In the third incoming power determination table 83, the incoming current is set to a smaller current within the range of currents that can be outputted in the USB standard operating mode when the number of prints (printing frequency (%)) for the time period into which the connection start time is categorized is lower. That is, the incoming current is set to a smaller current within the range of currents that can be outputted in the USB standard operating mode when the number of prints for the time period into which the connection start time was categorized is fewer. When the power supplying device 99 was connected in a time period during which the number of prints is few, the user is unlikely to print using the power receiving device 1 during this time period. Therefore, the power receiving device 1 can charge the battery 63 sufficiently with low incoming power so as not to generate heat in the battery 63.

Variations of the Third Embodiment

The third embodiment is not limited to the above description but may be modified in various ways. The first operating condition in the third embodiment may be related to any quantity that the print head 21 prints on print media. For example, the first operating condition in the third embodiment may be the number of sheets of print media printed by the print head 21 to date of each time period. Alternatively, the first operating condition may be the number of times the first printing process was executed for each time period by using power of the battery 63 charged by a single charge (by using power of the battery 63 during two successive charges).

Variations of the First Through Third Embodiments

The present disclosure is not limited to the first through third embodiments described above but may be modified in various ways. The structure of the power receiving device 1 may also be modified as appropriate. For example, the power receiving device 1 need not be provided with the battery 63. In this case, the power receiving device 1 receives power from the power supplying device 99 in accordance with its operating condition and prints by driving the print head 21 using the incoming power. The power receiving device 1 also need not be provided with the print head 21. In this case, the power receiving device 1 drives the conveying motor 11 and the like using power from the battery 63.

In the first through third embodiments, the power receiving device 1 and the power supplying device 99 are connected via the cable 98, which is a USB cable. However, the power receiving device 1 is not limited to incoming power transmitted in conformance with a USB standard, provided that the power receiving device 1 can set and receive the incoming power within the range of power that the power supplying device 99 can supply.

The operating conditions are not limited to those described in the first through third embodiments. For example, the operating condition may be the length of time that power for the power receiving device 1 is turned on after a single charge to the battery 63 and before a next single charge.

In the first through third embodiments, the value of current that is subtracted from the provisional incoming current in the process of S9 is not limited to 0.5 A. Moreover, the value of current that is subtracted from the provisional incoming current in the process of S9 need not be the same each time. For example, the amount to be subtracted from the provisional incoming current in the first embodiment when the CPU 51 determines that the load test was unsuccessful may be the current in the first incoming power determination table 81 provided just to the left of the current corresponding to the identified time range.

In the first through third embodiments, the CPU 51 sets the incoming voltage based on the detected USB standard operating mode. As an alternative, the CPU 51 may provisionally set the incoming voltage based on the detected USB standard operating mode. In this case, the CPU 51 may adjust the provisional incoming voltage based on a specific value of an operating condition. Further, when modifying the incoming voltage based on a specific value of an operating condition, the CPU 51 need not set the incoming power based on a specific value of an operating condition. In other words, the CPU 51 may perform at least one of setting the incoming voltage based on a specific value of an operating condition and setting the incoming current based on the specific value of the operating condition. Here, each of the incoming voltage and the incoming current is a factor to determine the incoming power.

In the first through third embodiments, the CPU 51 sets the incoming current by referencing one of the first incoming power determination table 81, the second incoming power determination table 82, and the third incoming power determination table 83 stored in the ROM 52 based on the USB standard operating mode of the power supplying device 99 detected via the cable 98 and the specific value identified from the operating condition. As an alternative, the CPU 51 may calculate the incoming current using a formula based on the USB standard operating mode and the specific value identified from the operating condition. For example, the power receiving device 1 may calculate and set an incoming current I using the equation I=W/(V·t) based on the amount of power W required for fully charging the battery 63, the incoming voltage V determined from the USB standard operating mode, and the connection time period t identified from the operating condition. In this case, the power receiving device 1 can receive more appropriate power in accordance with the operating condition. The connection time period t may be an average of the past connection time periods or a representative value of the time range specified in S4, such as a center value of the time range. Here, the center value is an average of the maximum and minimum values of the range. In this case, when the connection time period is larger than 4 hours, the center value may be set appropriate value such as 5 hours.

While the CPU 51 executes all steps in each of the first, second, and third power reception processes and the first and second printing processes in the above examples, all or some of these steps may be executed by another electronic device (an ASIC, for example). Alternatively, steps in each of these processes may be executed through distributed processing performed by a plurality of electronic devices (a plurality of CPUs, for example). An arrangement in which an operating system (OS) or the like running on the power receiving device 1 performs some or all of the steps in each of the above processes based on instructions from the CPU 51 also falls within the scope of the present disclosure.

Programs for executing the first, second, and third power reception processes and the first and second printing processes may be downloaded from a server connected to a network (not shown), i.e., transmitted as transmission signals, and may be stored in the flash memory 54. In this case, the programs for executing these processes may be saved in a non-transitory storage medium, such as a hard disk drive provided in the server.

In the above embodiments, the flash memory 53 is an example of the storage. The process of S2 is an example of the detecting. The processes of S4, S24, and S43 are an example of the identifying the condition. The processes of S5-S10 are an example of the detecting. The battery 63 is an example of the battery. The process of S15 is an example of the classifying the time period. The process of S16 is an example of the counting the value for the time range. The print head 21 is an example of the printing engine. The number of sheets is an example of the first print amount. The sheet-number range is an example of the amount range. The process of S35 is an example of the amount categorization process. The process of S36 is an example of the amount counting process. The process of S41 is an example of the acquiring. The process of S42 is an example of the specifying the time range. The first through third incoming power determination tables 81, 82, 83 are examples of the database. The ROM 52 is an example of the second storage. The process of S5 is an example of the provisionally setting. The drop voltage is an example of the power loss. The process of S7 is an example of the specifying the power loss. That is, the power loss is a loss of the power detected when the provisional incoming poser (provisional incoming current) is received. The process of S8 is an example of the determining. The process of S9 is an example of the confirming.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A power receiving device comprising:
a storage; and
a computer configured to perform:
storing a first operating condition indicating a past operating condition of the power receiving device in the storage;
detecting a power supplying capacity, of a power supplying device, within which the power supplying device can supply power;
identifying a specific value in relation to the first operating condition from the storage; and
setting an incoming power based on both the detected power supplying capacity and the identified specific value, thereby allowing the power supplying device to send the set incoming power; and the power receiving device, further comprising a battery configured to be charged by using the incoming power from the power supplying device,
wherein the first operating condition is a condition in relation to a connection time period in which the power supplying device is continuously connected to the power receiving device for a single charge indicating a charging operation.

2. The power receiving device according to claim 1, wherein the incoming power is set smaller when the specific value indicates that the connection time period is longer.

3. The power receiving device according to claim 1, wherein the computer is configured to further perform:
categorizing a connection time period for a single charge into a time range among a plurality of time ranges; and
counting a number among a plurality of numbers each defined for a corresponding one of the plurality of time ranges, wherein when the connection time period is categorized into a time range among the plurality of time ranges, a number corresponding to the time range is counted,
wherein the identifying identifies a time range corresponding to a maximum number among the plurality of numbers as the specific value.

4. The power receiving device according to claim 1, wherein the identifying identifies an average value of connection time periods stored in the storage as the specific value.

5. A power receiving device comprising:
a storage; and
a computer configured to perform:
storing a first operating condition indicating a past operating condition of the power receiving device in the storage;
detecting a power supplying capacity, of a power supplying device, within which the power supplying device can supply power;
identifying a specific value in relation to the first operating condition from the storage; and
setting an incoming power based on both the detected power supplying capacity and the identified specific value, thereby allowing the power supplying device to send the set incoming power; and
the power receiving device further comprising:
a battery configured to be charged by using the incoming power from the power supplying device; and
a print engine configured to be driven by power charged in the battery to print an image on a print medium,
wherein the first operating condition is a condition in relation to a print amount of printing by power of the battery during two successive single charges, each of the successive two single charges indicating a charging operation of the battery while the power supplying device is continuously connected to the power receiving device.

6. The power receiving device according to claim 5, wherein the incoming power is set smaller when the specific value indicates that the print amount is smaller.

7. The power receiving device according to claim 5, wherein the computer is configured to further perform:
categorizing a print amount into a print-amount range among a plurality of print-amount ranges; and
counting a number among a plurality of numbers each defined for a corresponding one of the plurality of print-amount ranges, wherein when the print amount is categorized into a print-amount range among the plurality of print-amount ranges, a number corresponding to the print-amount range is counted, wherein the identifying identifies a print-amount range corresponding to a maximum number among the plurality of numbers as the specific value.

8. The power receiving device according to claim 5, wherein the identifying identifies an average value of print amounts stored in the storage as the specific value.

9. The power receiving device according to claim 5, wherein the controller is configured to further perform:

storing, each time a single charge is performed, in the storage a print amount of printing by using power of the battery after the single charge and before another single charge next to the single charge, wherein the identifying identifies, as the specific value, a maximum print amount among the print amounts stored in the storage.

10. A power receiving device comprising:
a storage; and
a computer configured to perform:
storing a first operating condition indicating a past operating condition of the power receiving device in the storage;
detecting a power supplying capacity, of a power supplying device, within which the power supplying device can supply power;
identifying a specific value in relation to the first operating condition from the storage; and
setting an incoming power based on both the detected power supplying capacity and the identified specific value, thereby allowing the power supplying device to send the set incoming power; and
wherein the computer is configured to further perform:
acquiring a second operating condition indicating a present operating condition of the power receiving device,
wherein the identifying identifies the specific value based on the second operating condition.

11. The power receiving device according to claim 10, further comprising:
a battery configured to be charged by using the incoming power from the power supplying device; and
a print engine configured to be driven by power charged in the battery to print an image on a print medium,
wherein the first operating condition is a condition in relation to a print amount of printing for each of a plurality of time periods into which a day is divided, each print amount being an amount of printing printed by power of the battery during successive two single charges, each of the two successive single charges indicating a charging operation of the battery while the power supplying device is continuously connected to the power receiving device,
wherein the second operating condition indicates a connection start time at which the power supplying device is connected to the power receiving device for a single charge to be performed,
wherein the computer is configured to further perform:
categorizing the connection start time into a time period in which the connection start time is included among the plurality of time periods, wherein the identifying identifies, as the specific value, a print amount corresponding to the time period into which the connection start time is categorized.

12. The power receiving device according to claim 11, wherein the incoming power is set smaller when the identified print amount as the specific value is smaller.

13. A power receiving device comprising:
a storage; and
a computer configured to perform:
storing a first operating condition indicating a past operating condition of the power receiving device in the storage;
detecting a power supplying capacity, of a power supplying device, within which the power supplying device can supply power;
identifying a specific value in relation to the first operating condition from the storage; and
setting an incoming power based on both the detected power supplying capacity and the identified specific value, thereby allowing the power supplying device to send the set incoming power; and
the power receiving device further comprising a second storage storing a database that registers association information associating the power supplying capacity and an incoming power with each of candidate values, each candidate value being a candidate for the specific value,
wherein the setting sets the incoming power by referencing the database based on the detected power supplying capacity, and the identified specific value.

14. A power receiving device comprising:
a storage; and
a computer configured to perform:
storing a first operating condition indicating a past operating condition of the power receiving device in the storage;
detecting a power supplying capacity, of a power supplying device, within which the power supplying device can supply power;
identifying a specific value in relation to the first operating condition from the storage; and
setting an incoming power based on both the detected power supplying capacity and the identified specific value, thereby allowing the power supplying device to send the set incoming power; and
wherein the setting includes:
provisionally setting a provisional incoming power based on the power supplying capacity and the identified specific value;
identifying a power loss when the provisional incoming power is received from the power supplying device;
determining whether the identified power loss is larger than or equal to a prescribed threshold value; and
fixing a power smaller than the provisional incoming power as the incoming power when the power loss is larger than or equal to the prescribed threshold value.

15. The power receiving device according to claim 1, wherein the setting calculates the incoming power using the detected power supplying capacity and the identified specific value.

* * * * *